United States Patent
Khot et al.

(10) Patent No.: US 8,427,522 B2
(45) Date of Patent: Apr. 23, 2013

(54) REMOTELY MONITORING AND TROUBLESHOOTING A VIDEOCONFERENCE

(75) Inventors: Gautam Khot, Bangalore (IN); Hrishikesh G. Kulkarni, Bangalore (IN); Prithvi Ranganath, Bangalore (IN); Raghuram Belur, Bangalore (IN); Sandeep Lakshmipathy, Bangalore (IN)

(73) Assignee: LifeSize Communications, Inc., Austin, TX (US)

( * ) Notice: Subject to any disclaimer, the term of this patent is extended or adjusted under 35 U.S.C. 154(b) by 700 days.

(21) Appl. No.: 12/645,993

(22) Filed: Dec. 23, 2009

(65) Prior Publication Data

US 2011/0149013 A1  Jun. 23, 2011

(51) Int. Cl.
*H04N 7/15* (2006.01)
*H04L 12/66* (2006.01)
*G06F 15/16* (2006.01)

(52) U.S. Cl.
USPC ............ 348/14.08; 348/14.09; 358/1.15; 370/242; 370/252; 370/260; 370/312; 381/66; 455/445; 703/17; 709/204; 709/206; 709/224; 714/2; 715/717; 715/753; 725/87

(58) Field of Classification Search ............ 348/14.08, 348/14.09; 370/252, 260, 312, 352, 242; 381/66; 455/445; 709/206, 204, 224; 715/717, 715/753; 725/87; 358/1.15; 703/17; 714/2
See application file for complete search history.

(56) References Cited

U.S. PATENT DOCUMENTS

| | | | |
|---|---|---|---|
| 6,202,043 B1 * | 3/2001 | Devoino et al. ............ | 703/17 |
| 7,237,004 B2 | 6/2007 | Slobodin et al. | |
| 7,412,392 B1 | 8/2008 | Satapathy | |
| 7,436,428 B2 * | 10/2008 | Schrader et al. ......... | 348/14.08 |
| 7,668,912 B2 * | 2/2010 | Nelson et al. ............. | 709/204 |
| 7,715,037 B2 * | 5/2010 | Castellani et al. ......... | 358/1.15 |
| 7,777,777 B2 * | 8/2010 | Bowman et al. ......... | 348/14.08 |
| 7,885,194 B1 * | 2/2011 | Narin et al. .............. | 370/242 |
| 8,149,739 B2 * | 4/2012 | Kenoyer et al. .......... | 370/260 |
| 8,150,052 B2 * | 4/2012 | Gygax et al. ............. | 381/66 |
| 2003/0103075 A1 * | 6/2003 | Rosselot ................... | 345/717 |
| 2005/0028106 A1 * | 2/2005 | Nelson et al. ............. | 715/753 |
| 2006/0200550 A1 * | 9/2006 | Nelson et al. ............. | 709/224 |
| 2007/0268836 A1 * | 11/2007 | Byun et al. ............... | 370/252 |
| 2008/0031176 A1 * | 2/2008 | Hus .......................... | 370/312 |
| 2008/0155305 A1 * | 6/2008 | Hind et al. ................ | 714/2 |
| 2009/0201824 A1 * | 8/2009 | Leung et al. ............. | 370/252 |

(Continued)

*Primary Examiner* — Gerald Gauthier
(74) *Attorney, Agent, or Firm* — Meyertons Hood Kivlin Kowert & Goetzel, P.C.; Jeffrey C. Hood; Mark S. Williams

(57) ABSTRACT

System and method for performing a videoconference. One or more computers are utilized to passively monitor a videoconference call between a plurality of participants at respective participant locations, where the videoconference call is performed using a plurality of videoconferencing endpoints at respective ones of the participant locations, and where the monitoring includes monitoring one or more parameters from each of the videoconferencing endpoints. The videoconference call is actively monitored upon detecting values of the one or more parameters from a first videoconferencing endpoint indicating a lack of call quality, thereby generating active monitor data. The active monitor data is automatically analyzed to determine at least one problem causing lack of call quality, and at least one action is automatically determined and performed to address the at least one problem. The active monitoring may also be invoked manually, e.g., in response to user input.

25 Claims, 5 Drawing Sheets

U.S. PATENT DOCUMENTS

| | | | |
|---|---|---|---|
| 2009/0315974 A1* | 12/2009 | Matthews | 348/14.08 |
| 2010/0113037 A1* | 5/2010 | Ong et al. | 455/445 |
| 2010/0211981 A1* | 8/2010 | Shaul | 725/87 |
| 2010/0217806 A1* | 8/2010 | Khot et al. | 709/206 |
| 2011/0096673 A1* | 4/2011 | Stevenson et al. | 370/252 |
| 2011/0149013 A1* | 6/2011 | Khot et al. | 348/14.09 |

* cited by examiner

REMOTELY MONITORING AND TROUBLESHOOTING A VIDEOCONFERENCE

FIELD OF THE INVENTION

The present invention relates generally to videoconferencing, and more specifically, to a method for remotely monitoring and troubleshooting a videoconference.

DESCRIPTION OF THE RELATED ART

Video conferencing may be used to allow two or more participants at remote locations to communicate using both video and audio. Each participant location may include a videoconferencing system for video/audio communication with other participants. For example, each video conferencing system may include a camera and microphone to collect video and audio from a first or local participant to send to other (remote) participant(s), as well as a display and speaker(s) to reproduce video and audio received from one or more remote participants.

In any video conference there can be endpoints in any of various parts of the world, and via different networks. The quality of a call depends on various factors such as latency, router configurations, firewall settings, and so forth. In current systems, troubleshooting such calls typically involves logging into each of the endpoints and analyzing basic information, such as whether or not the endpoint is receiving video, checking call statistics for packet loss, jitter, and frame rate, etc. If any of these aspects are abnormal, manual intervention by an administrator is needed in order to evaluate the various causes of the problem and to attempt to provide a solution. There is very little that is currently automatically done by the system in case such deviations actually occur during a call. Typically, administrators attempt to solve video call quality issues by sitting in another remote location where the network conditions prevalent in the ground zero location are not fully evident to them. For example, in one simple approach, current systems may raise an SNMP (simple network management protocol) alert notification when certain parameters breach the acceptable call quality limits. However, addressing the problem still requires manual intervention by an administrator.

Accordingly, improved processes for monitoring and troubleshooting conferencing are desired.

SUMMARY OF THE INVENTION

Various embodiments are presented of a system and method for monitoring and troubleshooting a videoconference.

A videoconference may be initiated between a plurality of participants at respective participant locations. The videoconference may be performed using a plurality of videoconferencing endpoints at each of the participant locations. Thus, each videoconferencing endpoint may be used for communication by each participant at each participant location to participate in the videoconference.

The videoconference call may be passively monitored, where the monitoring may include monitoring one or more parameters from each of the videoconferencing endpoints, e.g., jitter, packet loss, frame rate, resolution, audio packet receive/transmit, video packet receive/transmit, CPU load, memory load, and/or network load, of each videoconferencing endpoint, among others. Note that as used herein, the term "passive monitoring" refers to monitoring, e.g., the one or more parameters of the endpoints, without interfering or intruding upon the system. In other words, the passive monitoring may watch and/or observe parameter values, but may not modify or re-configure them.

The videoconference call may be actively monitored upon detecting values of the one or more parameters from a first videoconferencing endpoint indicating a lack of call quality, thereby generating active monitor data. In other words, the passively monitored parameters may be analyzed to determine whether call quality may be at risk or degraded. Note that as used herein, the term "active monitoring" refers to monitoring in which a monitor program actively manipulates the activity and/or configuration of the endpoint(s) during the videoconferencing call, e.g., causing an endpoint to redirect data, collect and report additional information, and so forth. In other words, the monitor program takes an active part in endpoint operations during the call.

The active monitor data may be automatically analyzed to determine at least one problem causing lack of call quality. For example, in some embodiments, either through manual administrative intervention or automatically (without manual user intervention), the management server may decide to take an active part in the call by logging into the endpoints (called or callee) as a "silent partner". As used herein, the term "automatically" means that the operation is performed, e.g., by software, without requiring manual user input to direct or interactively manage the operation.

Then, at least one action may be automatically determined and performed to address the problem. In other words, once the problem has been determined, the method may include automatically determining an appropriate action to take, and performing that action. In various embodiments, the determination of the problem, the determination of the action, and the performance of the action may be performed by the management server, by management software executing on the endpoint, by the program (e.g., agent) executing on the endpoint, or any combination, as desired.

BRIEF DESCRIPTION OF THE DRAWINGS

A better understanding of the present invention may be obtained when the following detailed description is considered in conjunction with the following drawings, in which.

Figure 1:
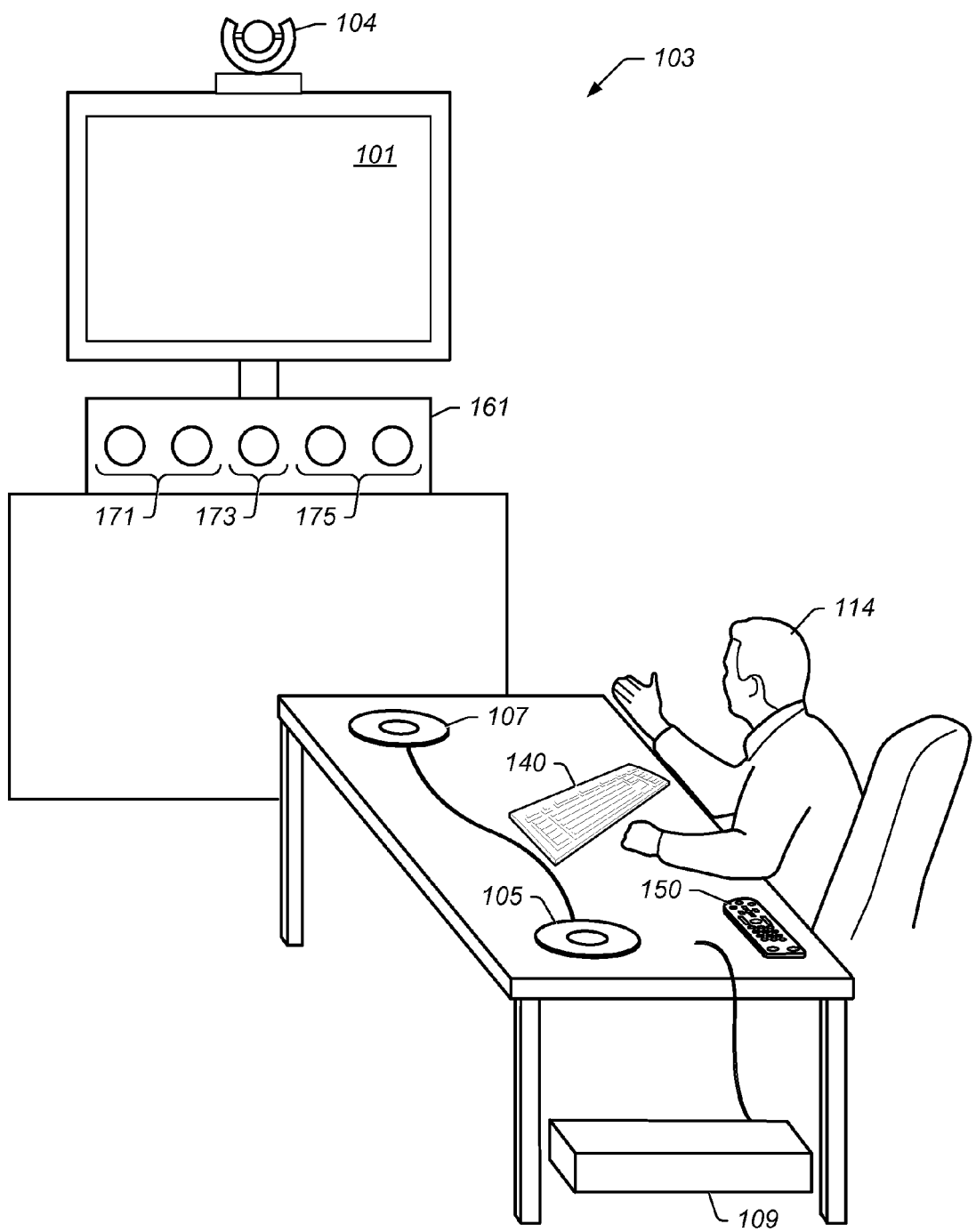
FIGS. 1 and 2 illustrate exemplary videoconferencing endpoints, according to respective embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note that the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

The following references are hereby incorporated by reference in their entirety as though fully and completely set forth herein U.S. patent application titled "Video Conferencing System Transcoder", Ser. No. 11/252,238, which was filed Oct. 17, 2005, whose inventors are Michael L. Kenoyer and Michael V. Jenkins.

U.S. patent application titled "Email Based Remote Management of Network Connected Entities", Ser. No. 12/389,902 which was filed Feb. 20, 2009, whose inventors are Gautam Khot, Prithvi Ranganath, Raghuram Belur, and Sandeep Lakshmipathy.

Figure 2:

FIGS. 1 and 2—Exemplary Videoconferencing Endpoints

FIG. 1 illustrates an exemplary embodiment of a videoconferencing endpoint 103 at a videoconferencing participant location. Note that, as used herein, the term videoconferencing endpoint, or simply "endpoint", may also be referred to as a videoconferencing system (VS), videoconferencing unit (VU), or conferencing unit (CU). The videoconferencing endpoint 103 may have a system codec 109 to manage both a speakerphone 105/107 and videoconferencing hardware, e.g., camera 104, display 101, speakers 171, 173, 175, etc. The speakerphones 105/107 and other videoconferencing endpoint components may be coupled to the codec 109 and may receive audio and/or video signals from the system codec 109. Note that the term "codec", is short for a compressor/decompressor device or functionality for encoding and/or decoding (e.g., compressing and decompressing) data (e.g., audio and/or video data), and may refer to any system and/or method for encoding and/or decoding such data. Thus, an endpoint may be or include a codec.

In some embodiments, the videoconferencing endpoint may include a camera 104 (e.g., an HD camera) for acquiring images of the participant (e.g., of participant 114). Other cameras are also contemplated. The endpoint may also include display 101 (e.g., an HDTV display). Images acquired by the camera 104 may be displayed locally on the display 101 and/or may be encoded and transmitted to other endpoints at other participant locations in the videoconference.

The endpoint may further include one or more input devices, such as the computer keyboard 140 or a mouse (not shown). In some embodiments, the one or more input devices may be used for the videoconferencing system 103 and/or may be used for one or more other computer systems at the participant location, as desired.

The endpoint may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to a system codec 109. The system codec 109 may be placed on a desk or on a floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system. The conferencing system may be controlled by a participant or user through the user input components (e.g., buttons) on the speakerphones 105/107 and/or input devices such as the keyboard 140 and/or the remote control 150. Other system interfaces may also be used.

In various embodiments, a codec may implement a real time transmission protocol. In some embodiments, a codec (which may be short for "compressor/decompressor") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, the videoconferencing system 103 may be designed to operate with normal display or high definition (HD) display capabilities. The videoconferencing system 103 may operate with network infrastructures that support T1 capabilities or less, e.g., 1.5 mega-bits per second or less in one embodiment, and 2 mega-bits per second in other embodiments.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and may not be used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system 200 with a video camera, input devices, microphone and/or speakers such as the videoconferencing system of FIG. 2). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

The videoconferencing system 103 may execute various videoconferencing application software that presents a graphical user interface (GUI) on the display 101. The GUI may be used to present an address book, contact list, list of previous callees (call list) and/or other information indicating other videoconferencing systems that the user may desire to call to conduct a videoconference.

Note that the videoconferencing system shown in FIGS. 1 and 2 may be modified to be an audioconferencing system. The audioconferencing system, for example, may simply include speakerphones 105/107, although additional components may also be present. Additionally, note that any reference to a "conferencing system" or "conferencing systems" may refer to videoconferencing systems, audioconferencing systems (e.g., teleconferencing systems), or web conferencing systems. For simplicity and clarity, the techniques disclosed herein are primarily described in terms of videoconferencing, although it should be noted that the techniques may be equally applicable to teleconferencing and/or web conferencing. Moreover, the term "videoconferencing" is considered to be a superset of teleconferencing and web conferencing, and so the below descriptions directed to videoconferencing inherently include teleconferencing and web conferencing, as well. Thus, for example, in embodiments, one or more participants may join the videoconference over the web by communicatively coupling to the host codec/endpoint of the videoconference. Similarly, audio (only) participants may join in via dialing a PSTN (public switched telephone network) call into the ongoing videoconference call, where they may only hear the audio of the ongoing videoconference call.

Thus, in some embodiments, the videoconferencing endpoint or CU (e.g., of FIG. 1 or 2) may be configured with program instructions (i.e., stored in a memory of the endpoint) that may be executable by a processor of the endpoint to perform or implement at least a portion of the functionality and techniques disclosed herein, as will be described in detail below.

Figure 3A:
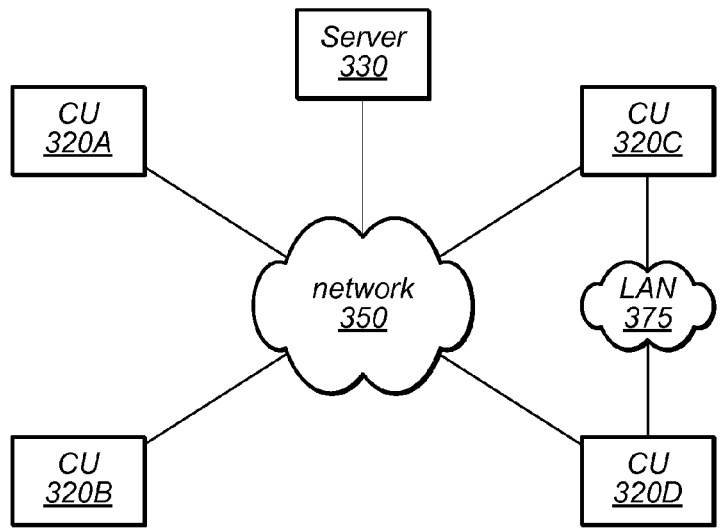
FIGS. 3A and 3B illustrate exemplary conferencing systems coupled in different configurations, according to some embodiments.
Figure 3B:
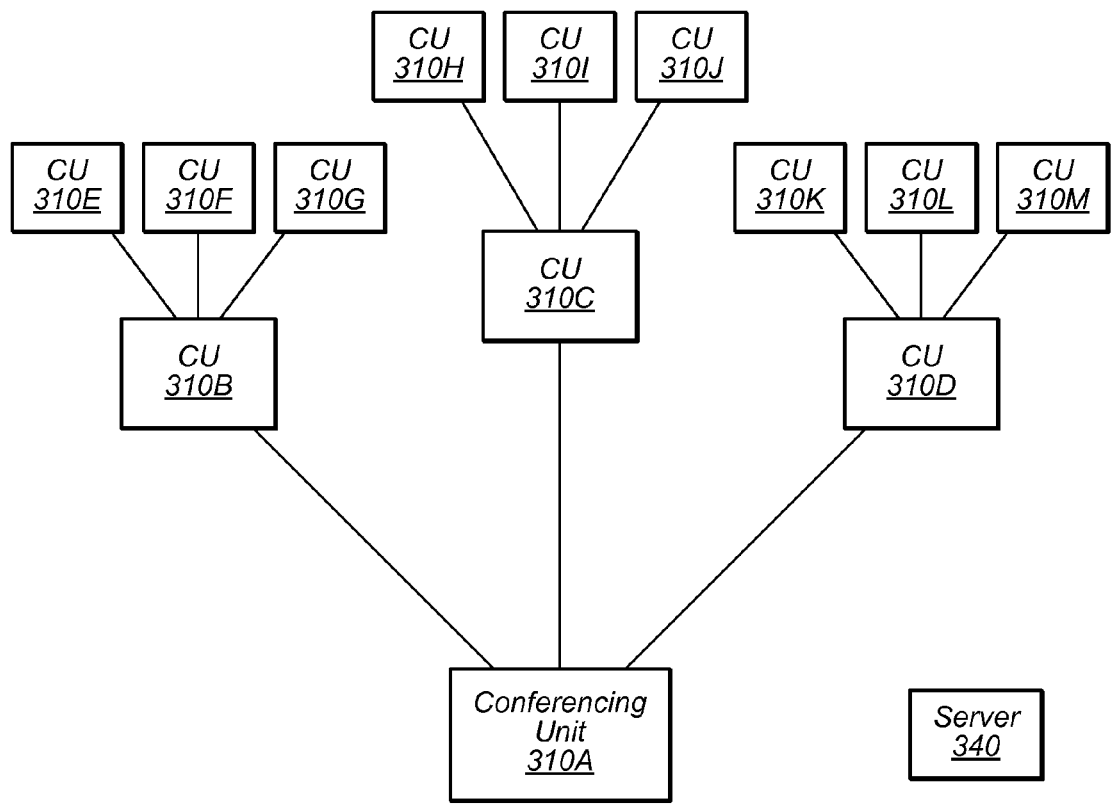

FIGS. 3A and 3B—Exemplary Conferencing Systems

FIGS. 3A and 3B illustrate different configurations of conferencing systems. The conferencing systems may be operable to perform the methods described herein. As shown in FIG. 3A, endpoints or conferencing units (CUs) 320A-D (e.g., videoconferencing endpoints described above) may be connected via network 350 (e.g., a wide area network such as the Internet) and CU 320C and 320D may be coupled over a local area network (LAN) 375. The networks may be any type of network (e.g., wired or wireless) as desired. As FIG. 3A shows, in one embodiment, the conferencing system may further include a server computer 330, coupled to the endpoints (or CUs) via the network 350. The server computer 330 may include a processor and memory, and, possibly in conjunction with one or more of the endpoints, may be configured to implement or perform at least a portion of the functionality and techniques disclosed herein. In some embodiments, the server 330 may be or include or be included in an endpoint or CU, as desired, or may be distributed across multiple endpoints.

FIG. 3B illustrates a relationship view of endpoints or conferencing units 310A-310M, according to one embodiment. As shown, endpoint or CU 310A may be aware of CU 310B-310D, each of which may be aware of further CU's (310E-310G, 310H-310J, and 310K-310M respectively). CU 310A may be operable to perform the methods described herein. In a similar manner, each of the other CUs shown in FIG. 3B, such as CU 310H, may be able to perform the methods described herein, as described in more detail below. Similar remarks apply to CUs 320A-D in FIG. 3A.

As also shown, in this embodiment, a server computer 340 may be communicatively connected to CU 310A, and thereby coupled to all of the CUs, although in various other embodiments, the server computer 340 may be coupled to the CUs via other means, e.g., via a network, such as a LAN or the Internet, to which the CUs are themselves coupled, or via any of the CUs in the system. The server, possibly in conjunction with one or more of the endpoints, may be configured to perform or implement at least a portion of the techniques disclosed herein, as will be described in more detail below.

As with the system of FIG. 3A, in some embodiments, the server 340 may be or include or be included in an endpoint or CU, as desired, or may be distributed across multiple endpoints (CUs).

Overview

Below are described various troubleshooting techniques that may significantly improve video/audio call quality monitoring and may automatically handle problems whose causes and solutions are known. In some embodiments, a management server may constantly (and passively) monitor basic parameters of the call, such as jitter, packet loss, frame rate, etc. As soon as the management server detects that there may be significant deviations from acceptable call quality, e.g., deviations from the service level agreement (SLA), the management server may log into the call as a "silent partner" or "listening participant" in order to actively monitor the content of the call. In some embodiments, if required, the management server may start monitoring signaling and media information. The management server may analyze the behavior and/or parameters of the endpoints and, based on the problem analysis, may take various steps to prevent or restore call quality, e.g., by pushing a set of settings to each of the endpoints, changing the call topology, or replacing the endpoint/CU causing the problem, among others.

Figure 4:
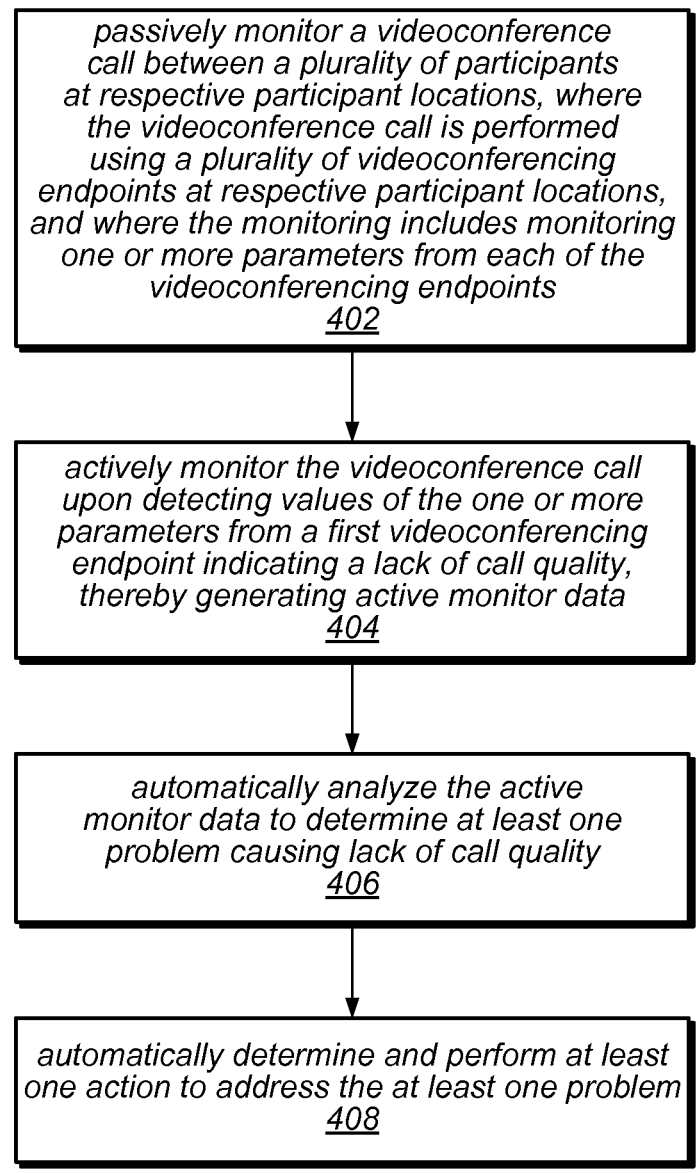
FIG. 4 is a flowchart diagram illustrating an exemplary method for performing a video conference, according to an embodiment.

FIG. 4—Method for Performing a Videoconference

FIG. 4 illustrates a method for performing a video conference, according to one embodiment. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, a videoconference call between a plurality of participants at respective participant locations may be passively monitored. The videoconference call may be performed using a plurality of videoconferencing endpoints at respective ones of the plurality of participant locations, and the monitoring may include monitoring one or more parameters from each of the videoconferencing endpoints. Thus, each participant location may include a respective endpoint or conferencing unit, such as those described above with reference to FIGS. 1 and 2. Each endpoint may be used by a respective participant to perform or implement the conference call, e.g., by providing and receiving conference communication for each participant. Thus, the plurality of endpoints may be comprised in a videoconferencing system that may facilitate or implement videoconferencing calls among respective participants at respective participant locations.

Note that as used herein, the term "passive monitoring" refers to monitoring, e.g., the one or more parameters of the endpoints, without interfering or intruding upon the system.

In other words, the passive monitoring may watch and/or observe parameter values, but may not modify or re-configure them.

In one embodiment, the passive monitoring of one or more parameters from each of the videoconferencing endpoints may include passively monitoring one or more of: jitter, packet loss, frame rate, resolution, audio packet receive/transmit, video packet receive/transmit, CPU load, memory load, or network load of each videoconferencing endpoint, although it should be noted that any other parameter or parameters may be passively monitored as desired.

Note further that in some embodiments, the plurality of endpoints (or CUs) may itself be a subset of a larger plurality of endpoints. For example, in addition to the plurality of endpoints, the videoconferencing system may include or be coupled to additional endpoints that may be operable to participate in the videoconference call, but which may not be configured to perform some of the functionality or techniques disclosed herein.

Moreover, in some embodiments, one or more participants (and corresponding endpoints) in the videoconferencing call may operate as web conferencing participants/endpoints, or as teleconferencing participants/endpoints. For example, in a teleconference embodiment, a participant/endpoint may participate in the videoconference call via audio, and may not include video information. Likewise regarding web conferencing participants/endpoints. In other words, some of the participants/endpoints may utilize only a subset of the videoconferencing data stream.

In one embodiment, the passive monitoring may be performed by a server computer coupled to the endpoints, e.g., server 330 or 340. In other words, in some embodiments, the server computer (which in some embodiments may be an endpoint/CU) may be or include a management server, and may be configured to passively monitor the one or more parameters of each of the plurality of endpoints.

As indicated above, the conference may be an audioconference, such as a teleconference, where at least a subset or all of the participants are called using telephone numbers. Alternatively, the audioconference could be performed over a network, e.g., the Internet, using VoIP. Similarly, the conference may be a videoconference, and the conference may be established according to any of a variety of methods, e.g., as described in patent application Ser. No. 11/252,238, which was incorporated by reference above. In some embodiments, the videoconference or audioconference may utilize an instant messaging service or videoconferencing service over the Internet, as desired.

Thus, in some embodiments, the management server may (passively) monitor a call being conducted between the plurality of endpoints, where the call may be launched by the server, or may be an ad-hoc call. As a part of this passive monitoring, the server may monitor parameters such as jitter, packet loss, frame rate, resolution, audio packet receive/transmit, and video packet receive/transmit, among others.

In 404, the videoconference call may be actively monitored upon detecting values of the one or more parameters from a first videoconferencing endpoint indicating a lack of call quality, thereby generating active monitor data. In other words, the passively monitored parameters may be analyzed to determine whether call quality may be at risk or degraded. For example, in one embodiment, the management server may make a decision regarding whether the device has a call quality issue based on standard or configured thresholds and/or optimal operating thresholds based on historical monitoring data for the individual devices, i.e., endpoints. The management server may also monitor any configuration changes on an endpoint which can impact the call or its quality; for example, the management server may track endpoint settings related to bandwidth, video quality, audio priority list, and/or NAT configuration, among others.

In one embodiment, a program may run or execute on each endpoint, and may be configured to listen on (i.e., monitor) a configured port (of the endpoint), waiting for invocation from the management server to perform the active monitoring of 404. In other words, the management server may passively monitor various parameters of or from each endpoint, and upon determining that call quality may be degraded or at risk, e.g., based on the values of parameters for an endpoint, and may invoke the program on that endpoint to actively monitor that endpoint. Thus, for example, in some embodiments, actively monitoring the videoconference call may include invoking an active monitor program comprised in the first videoconferencing endpoint to collect one or more of: network data of the first videoconferencing endpoint, e.g., media packets of the first videoconferencing endpoint, and/or signaling packets of the first videoconferencing endpoint, critical log data of the first videoconferencing endpoint, or configuration data of or for the endpoint.

Note that in various embodiments, the (active monitoring) program may be implemented in any of various forms. In one embodiment, the program may be or include agent software, e.g., may be referred to as a "smart monitor", i.e., may include some intelligence regarding the monitoring of the call (at that endpoint). The management server may thus invoke the program (e.g., the agent or smart monitor) on the endpoint to perform the active monitoring. In another embodiment, the program may be configured to operate under the control of the management server. For example, in one embodiment, the program may be or comprise an API or set (e.g., library) of functions that are invocable by the management server to perform the active monitoring.

In 406, the active monitor data may be automatically analyzed to determine at least one problem causing lack of call quality. For example, in some embodiments, either through manual administrative intervention or automatically, the management server may decide to take an active part in the call by logging into the endpoints (called or callee) as a "silent partner". In one embodiment of this approach, the server may connect to the program executing on an endpoint, e.g., through custom H323/SIP extensions. The program may not decode any media information received from the management server, and hence none of the endpoint's resources may be used. The management server may receive a copy of any media from the monitored endpoint(s), thus allowing the administrator to observe the call quality first hand without actively participating in the call. Once the management server receives this information, it may analyze the data, e.g., signaling data, media data, and/or the endpoint's configuration information, to diagnose the actual reason for the problem. In an alternative embodiment, instead of the management server performing the above passive monitoring and analyses, a management program may reside on the endpoint itself, and may provide the functionality described herein with respect to the management server. In other embodiments, the monitoring and analyzing may be performed by any combination of software executing on the server computer and software executing on the endpoint(s).

In one embodiment, the automatically analyzing may include comparing source and destination addresses and ports of the media packets with source and destination addresses and ports indicated by the signaling packets. In other words, the analysis may include determining if the data to and from the endpoints is being transmitted to the correct addresses and ports.

In 408, at least one action may be automatically determined and performed to address the at least one problem. In other words, once the problem has been determined, the method may include automatically determining an appropriate action to take, and performing that action. In various embodiments, the determination of the problem, the determination of the action, and the performance of the action, may be performed by the management server, by management software executing on the endpoint, by the program (e.g., agent) executing on the endpoint, or any combination, as desired.

Thus, for example, in one embodiment, the active monitor program (e.g., executing on the first videoconferencing endpoint) may analyze at least some of the active monitor data to generate endpoint analysis results, and send the endpoint analysis results to the server computer, e.g., the management server, which may then include these results in its analysis. In other words, automatically analyzing the active monitor data to determine at least one problem causing lack of call quality may further include receiving and analyzing the endpoint analysis results.

Thus, in some embodiments, the above passively monitoring the videoconference call may be performed by a server computer, e.g., the management server, while the actively monitoring the videoconference call may be performed by a program executing on the first videoconferencing endpoint, e.g., the active monitor program, e.g., the smart monitor or agent. Finally, in some embodiments, the automatically analyzing the active monitor data and automatically determining and performing at least one action to address the at least one problem may be performed by the server computer, e.g., the management server. Note, however, that in other embodiments, these functions may be performed by any combination of server and endpoint devices.

In one embodiment, the automatically analyzing may include reflecting data sent from the first videoconferencing endpoint to the at least one other videoconferencing endpoint back to the first videoconferencing endpoint, and comparing the sent data with the reflected data.

For example, in one embodiment, actively monitoring the videoconference call may further include the active monitoring program included in the first videoconferencing endpoint invoking an active monitoring program included in a second videoconferencing endpoint to reflect network data received from the first videoconferencing endpoint back to the first videoconferencing endpoint. The active monitoring program in the first videoconferencing endpoint may then send the collected and reflected data to a server computer for the automatically analyzing of 406.

In some embodiments, in response to determining that automatically analyzing the active monitor data from the first videoconferencing endpoint cannot determine the at least one problem, the method may include actively monitoring at least one other videoconferencing endpoint of the plurality of videoconferencing endpoints, thereby generating additional active monitor data. Automatically analyzing the active monitor data to determine the at least one problem causing lack of call quality may thus include automatically analyzing the additional active monitor data to determine the at least one problem causing lack of call quality. In other words, if processing (i.e., actively monitoring, analyzing, etc.) the first videoconferencing endpoint doesn't result in a determined problem/solution, the method may include actively monitoring one or more others of the endpoints involved in the call, e.g., the management server may invoke active monitor programs on one or more other endpoints. In some embodiments, such active monitoring of one or more additional endpoints may be performed as a matter of course. In some embodiments, the method may repeat this process with subsequent endpoints until a problem/solution is determined, or may determine that human intervention is required, and request help from support personnel.

Thus, in some embodiments, actively monitoring the videoconference call may further include invoking an active monitoring program comprised in a second videoconferencing endpoint to collect one or more of: network data of the second videoconferencing endpoint, which may include one or more of: media packets of the second videoconferencing endpoint, or signaling packets of the second videoconferencing endpoint, critical log data of the second videoconferencing endpoint, or configuration data of the second videoconferencing endpoint. Moreover, similar to the sequential invocation of active monitoring programs described above, in some embodiments, the active monitoring program of the second videoconferencing endpoint may invoke the active monitoring program comprised in the first videoconferencing endpoint to reflect network data received from the second videoconferencing endpoint back to the second videoconferencing endpoint. The active monitoring program comprised in the second videoconferencing endpoint may then send the collected and reflected data to the server computer for the automatically analyzing of 408. Note that the above two-stage active monitoring process is meant to be exemplary only, and that other variations are contemplated. For example, in various embodiments, the order of the endpoints actively monitored may be vary, e.g., rather than actively monitoring the first endpoint, then the second endpoint, in some embodiments, the second endpoint may be actively monitored first, then the first endpoint, and so forth. Moreover, in some embodiments, the described two-stage method may be extended to include further stages as necessary, wherein additional endpoints are actively monitored in the manner described herein.

Figure 5A:
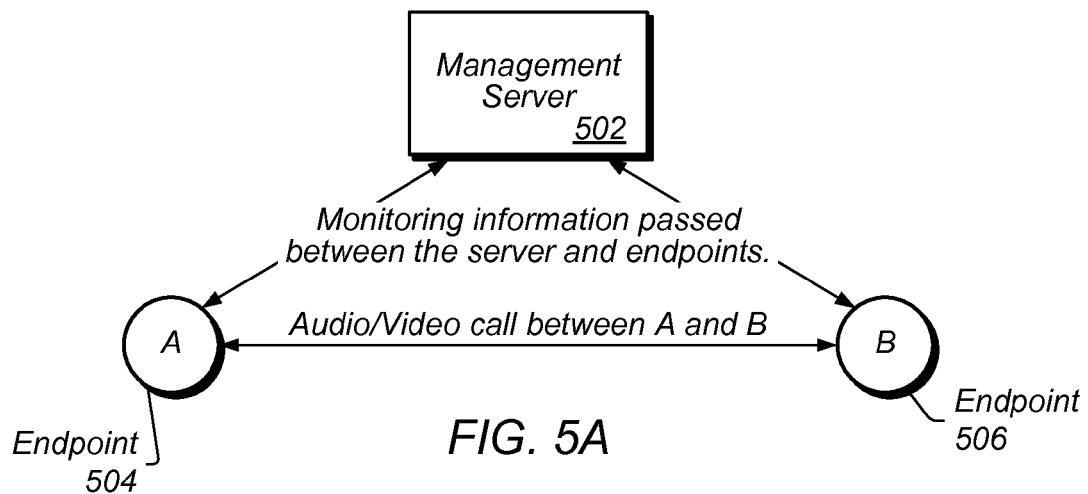
FIGS. 5A, 5B, and 5C illustrate an exemplary videoconferencing troubleshooting sequence, according to one embodiment.
Figure 5B:
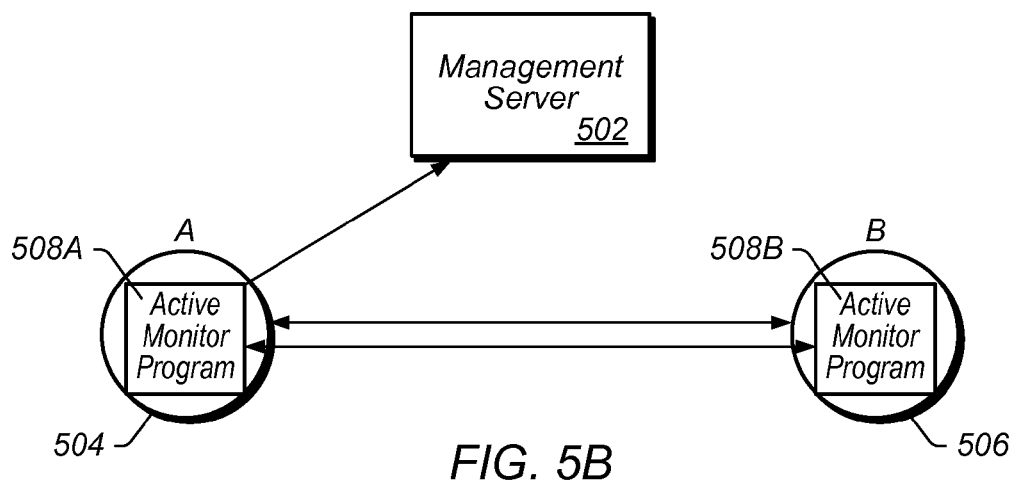
Figure 5C:
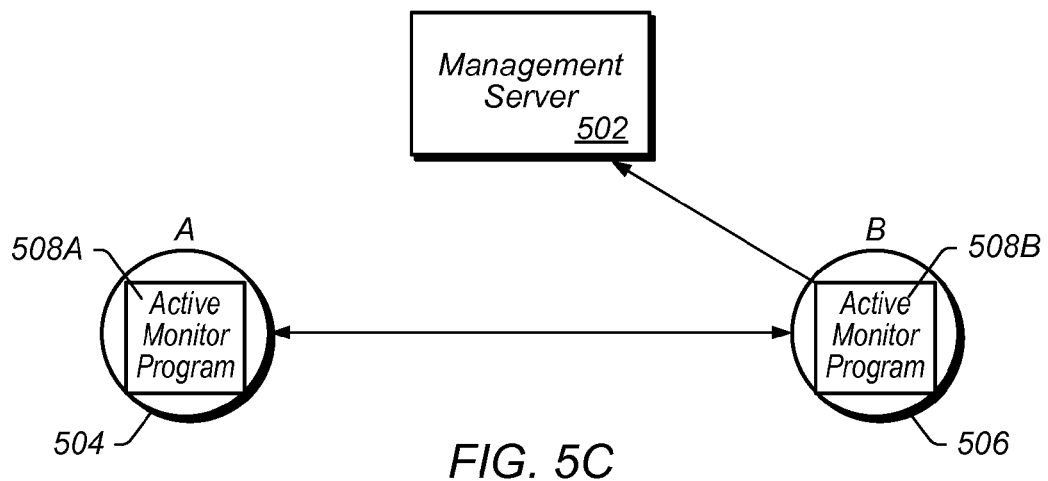

FIGS. 5A-5C, described below, illustrate one embodiment of such an approach.

FIGS. 5A-5C: Exemplary Monitoring and Analysis Sequence

FIGS. 5A through 5C illustrate an exemplary monitoring and analysis sequence, whereby a videoconferencing call between two endpoints is monitored and analyzed for troubleshooting purposes. It should be noted, however, that the sequence or technique described is meant to be exemplary only, and is not intended to limit the techniques described herein to any particular sequence or functionality.

As FIG. 5A shows, in this exemplary embodiment a management server 502 is communicatively coupled to endpoints A (504) and B (506), between which a video call (or audio call, or web conference) is being conducted. It should be noted, however, that generally there may be additional endpoints coupled to the server, as well. As may be seen, the management server may monitor information passed between the server and the endpoints, e.g., parameters relating to each of the endpoints. In other words, initially the management server may be in a "watching" (or "listening") mode wherein it observes or monitors the one or more parameters. This passive aspect of the monitoring is represented by the dashed lines between the server and the endpoints.

Upon detection that there is a problem with the call quality, the management server may connect to the call to actively take part in the call. Consider a case, for example, where a problem exists with respect to endpoint A. Note that at this point, the management server does not know where the problem originates, and so may actively monitor one or more of the endpoints to locate and determine the problem.

FIG. 5B illustrates an exemplary troubleshooting stage or step where reception of data sent from endpoint B is considered or analyzed. As shown, the management server may connect to the active monitor program 508A of endpoint A, which is monitoring or listening at or on endpoint A, and may request data for reception analysis of data transmitted from endpoint B. The active monitor program 508A of endpoint A in turn may connect to the active monitor program 508B on endpoint B, and request data for analysis of data transmitted to endpoint B. In response, the active monitor program 508B on endpoint B may reflect all data transmitted from endpoint B to the active monitor program 508A of endpoint A, which in turn may reflect it to the management server for analysis. In other words, the management server may operate through endpoint A to collect data transmitted between endpoint A and endpoint B, including A to B data transmission, and B to A data transmission.

FIG. 5C illustrates an exemplary second troubleshooting stage or step where reception of data sent from endpoint B is analyzed. Here the management server may connect to the active monitor program 508B on endpoint B (which is listening at or on endpoint B), and may request data for analysis of data transmitted from endpoint B. The active monitor program 508B on endpoint B may begin reflecting packets transmitted from endpoint B to endpoint A to the management server.

Similarly, in one embodiment, if the management server detects or suspects a problem with endpoint B, it may invert the above described analysis sequence, i.e., by connecting to the active monitor program 508B on endpoint B in the first stage or step, and then to the active monitor program 508A of endpoint A for the second stage or step (or vice versa). Based on the data collected from both stages or steps, the management server may have enough information to troubleshoot the call.

It should be noted that in some embodiments, the user may manually initiate the above described active monitoring/troubleshooting session with the management server, e.g., by sending an email to an endpoint mailbox, by clicking specific buttons on a remote control, or via any other mechanism supported by the system, as desired. For more details regarding use of endpoint mailboxes, please see U.S. patent application Ser. No. 12/389,902, titled "Email Based Remote Management of Network Connected Entities", which was incorporated by reference above.

For example, in one embodiment, user input may be received invoking active monitoring of a videoconference call between a plurality of participants at respective participant locations, where the videoconference call is performed using a plurality of videoconferencing endpoints at each of the participant location. In response to receiving the user input, an active monitoring program included in the first videoconferencing endpoint may be invoked to actively monitor the videoconference call, thereby generating active monitor data. The active monitor data may be received and automatically analyzed, e.g., by a server, to determine at least one problem causing lack of call quality, and at least one action may be automatically determined and performed to address the at least one problem. In other words, in some embodiments, the passive monitoring step may be omitted, and the user, e.g., an administrator, may invoke the active monitoring/troubleshooting manually.

Examples of various problems and actions are provided below. It should be noted that the problems and solutions presented are meant to be exemplary only, and are not intended to limit the problems detected, nor solutions or actions performed, to any particular set of problems or solutions/actions.

In one embodiment, each media packet may contain a unique sequence number and an embedded timestamp indicating the time at which it was created. The management server may detect a missing packet if it misses a sequence number or a timestamp. Thus, the management server (or management software located on the endpoints) may detect loss of packets based on timestamp or sequence number information embedded in the media packets.

In one embodiment, the management server may request media statistics such as jitter, packet loss, delay, frame rate, etc. (see list above), for both transmit and receive streams, and may detect problems in the call, e.g., loss of packets, based on analyzing these parameters.

In one embodiment, the management server may detect problems with changes in settings and its resolution. For example, the management server may include funtionality to detect any changes to the various settings affecting a call, and may maintain a history of changes for each such setting. Based on this settings change history from the called and callee endpoints, the management server may report a change in settings which could be the cause of the issue, and may also suggest changes to specific settings which may fix the issue.

In one embodiment, the management server may resolve call quality issues based on call data records (CDR). For example, based on CDRs collected from the called and callee endpoints, the management server may derive or determine optimal settings for the call. Settings contemplated include one or more of: optimal bandwidth, codecs (audio/video codecs such as H.264 or AAC LC, etc.), protocol (e.g., H.323, SIP, ISDN etc.), among others. These settings may be set according to or based on the time of the day and current network traffic. Based on these setting, a suggestion may be determined to address the problem.

In one embodiment, the management server may resolve call quality issues based on network topology. For example, based on detected or known network traffic bottlenecks, and/or occupancy levels of various infrastructure components, the management server may suggest a call route through a multipoint control unit (MCU), transit server, or another infrastructure device or product. As another example, in the case where a built-in ISDN capability fails, the management server may redirect ISDN calls through a gateway. Note that as used herein, an MCU, which may also be referred to as a bridge, may operate to help connect multiple codecs or endpoints together so that a multiparty (i.e., more than 2 participants) call is possible, and may be included in one or more of the endpoints/codecs. Such an MCU may be referred to as an embedded MCU, because it is part of the endpoint/codec itself.

Examples of hardware MCUs (which in some embodiments may be dedicated for bridging purposes only) include the Codian series and LifeSize Multipoint. Such MCUs may reside in data centers and may not have any camera or display attached to them, e.g., may only be accessible over an IP network.

In one embodiment, the management server may resolve call quality issues based on signaling capture from the called or callee endpoints. For example, the management server may detect a failure or error due to faulty network elements, such as an ALG, home router, or firewall device.

In one embodiment, the management server may resolve call quality issues based on statistics and call logs of an active call, e.g., to detect a lack of media, either in direction or type (e.g., audio, video, or presentation).

In one embodiment, in case of a failure to determine or resolve the problem itself, the management server may collect call logs, network statistics, media capture, configuration copy, and/or summary report from the endpoints and report the error to a support process or personnel.

Thus, the method may resolve any of numerous different problems based on various types of information related to the call, possibly including endpoint parameters and performance data, as well as network related information, e.g., network performance data, topology, infrastructure devices, and so forth. As noted above, the above problems and solution techniques are exemplary only, and are not intended to limit the problems and solution approaches to any particular set or type of problems or solutions.

Embodiments of the above troubleshooting techniques may be applicable to numerous applications. For example, some embodiments of the above method may enable real-time troubleshooting of a videoconferencing (or teleconferencing, or web conferencing) system when during a call. Note that in many cases such troubleshooting cannot be performed solely by an endpoint in a call because of the endpoint's computational limitations. Moreover, since problems may occur at any of the connected endpoints in a call, it may be difficult for individual endpoints to invoke or perform such a session.

In contrast, in some embodiments, the above-described management server may store or have access to a great deal of historical data regarding issues or problems caused in various different networks, and actions taken to resolve specific problems, which can be brought to bear against present problems.

Note that since in embodiments of the method discussed above, problems are handled in real-time, overall customer call satisfaction may increase multifold.

Moreover, such automatic resolution of call quality problems may relieve an administrator of having to manually log into each of the endpoints and determine (or guess) the source of the problem.

Embodiments of the systems and methods described herein have substantial advantages over prior approaches. For example, as discussed above, an important part of an ideal troubleshooting session may include continuously monitoring a system during a call and checking for any significant deviations from the desirable call performance/quality statistics. In many cases detected problems can be solved by known solutions which can be automatically programmed into the system. Having a remote partner in every such affected location/endpoint available to help the administrator may thus provide substantial benefits.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A computer-implemented method for performing a videoconference, comprising:
   utilizing one or more computers to perform:
      passively monitoring a videoconference call between a plurality of participants at respective participant locations, wherein the videoconference call is performed using a plurality of videoconferencing endpoints at respective ones of the participant locations, and wherein said monitoring comprises monitoring one or more parameters from each of the videoconferencing endpoints;
      actively monitoring the videoconference call upon detecting values of the one or more parameters from a first videoconferencing endpoint indicating a lack of call quality, thereby generating active monitor data;
      automatically analyzing the active monitor data to determine at least one problem causing lack of call quality; and
      automatically determining and performing at least one action to address the at least one problem.

2. The computer-implemented method of claim 1, wherein said passive monitoring one or more parameters from each of the videoconferencing endpoints comprises passively monitoring one or more of:
   jitter, packet loss, frame rate, resolution, audio packet receive/transmit, video packet receive/transmit, CPU load, memory load, or network load of each videoconferencing endpoint.

3. The computer-implemented method of claim 1, wherein said actively monitoring the videoconference call comprises invoking an active monitoring program comprised in the first videoconferencing endpoint to:
   collect one or more of:
      network data of the first videoconferencing endpoint, comprising one or more of:

media packets of the first videoconferencing endpoint; or signaling packets of the first videoconferencing endpoint;

critical log data of the first videoconferencing endpoint; or configuration data of the first videoconferencing endpoint.

4. The computer-implemented method of claim 3, wherein said actively monitoring the videoconference call further comprises:

the active monitoring program comprised in the first videoconferencing endpoint invoking an active monitoring program comprised in a second videoconferencing endpoint to:

reflect network data received from the first videoconferencing endpoint back to the first videoconferencing endpoint; and the active monitoring program comprised in the first videoconferencing endpoint sending the collected and reflected data to a server computer for said automatically analyzing.

5. The computer-implemented method of claim 4, wherein said actively monitoring the videoconference call further comprises invoking an active monitoring program comprised in a second videoconferencing endpoint to:

collect one or more of:

network data of the second videoconferencing endpoint, comprising one or more of:

media packets of the second videoconferencing endpoint; or signaling packets of the second videoconferencing endpoint;

critical log data of the second videoconferencing endpoint; or configuration data of the second videoconferencing endpoint; and invoke the active monitoring program comprised in the first videoconferencing endpoint to:

reflect network data received from the second videoconferencing endpoint back to the second videoconferencing endpoint; and the active monitoring program comprised in the second videoconferencing endpoint sending the collected and reflected data to the server computer for said automatically analyzing.

6. The computer-implemented method of claim 3, wherein said automatically analyzing comprises:

comparing source and destination addresses and ports of the media packets with source and destination addresses and ports indicated by the signaling packets.

7. The computer-implemented method of claim 3, further comprising:

utilizing the one or more computers to perform:

the active monitoring program analyzing at least some of the active monitor data to generate endpoint analysis results; and sending the endpoint analysis results to a server computer;

wherein said automatically analyzing the active monitor data to determine at least one problem causing lack of call quality further comprises receiving and analyzing the endpoint analysis results.

8. The computer-implemented method of claim 1, further comprising:

utilizing the one or more computers to perform:

in response to determining that said automatically analyzing the active monitor data from the first videoconferencing endpoint cannot determine the at least one problem:

actively monitoring at least one other videoconferencing endpoint of the plurality of videoconferencing endpoints, thereby generating additional active monitor data;

wherein said automatically analyzing the active monitor data to determine the at least one problem causing lack of call quality comprises:

automatically analyzing the additional active monitor data to determine the at least one problem causing lack of call quality.

9. The computer-implemented method of claim 8, wherein said automatically analyzing comprises:

reflecting data sent from the first videoconferencing endpoint to the at least one other videoconferencing endpoint back to the first videoconferencing endpoint; and comparing the sent data with the reflected data.

10. The computer-implemented method of claim 1, wherein said passively monitoring the videoconference call is performed by a server computer;

wherein said actively monitoring the videoconference call is performed by a program executing on the first videoconferencing endpoint; and wherein said automatically analyzing the active monitor data and said automatically determining and performing at least one action to address the at least one problem is performed by the server computer.

11. A non-transitory computer accessible memory medium storing program instructions for performing a videoconference, wherein the program instructions are executable by a processor to implement:

passively monitoring a videoconference call between a plurality of participants at respective participant locations, wherein the videoconference call is performed using a plurality of videoconferencing endpoints at each of the participant locations, and wherein said monitoring comprises monitoring one or more parameters from each of the videoconferencing endpoints;

in response to detecting values of the one or more parameters from a first videoconferencing endpoint indicating a lack of call quality, invoking an active monitoring program comprised in the first videoconferencing endpoint to actively monitor the videoconference call, thereby generating active monitor data;

receiving and automatically analyzing the active monitor data to determine at least one problem causing lack of call quality; and automatically determining and performing at least one action to address the at least one problem.

12. The non-transitory computer accessible memory medium of claim 11, wherein said passive monitoring one or more parameters from each of the videoconferencing endpoints comprises passively monitoring one or more of:

jitter, packet loss, frame rate, resolution, audio packet receive/transmit, video packet receive/transmit, CPU load, memory load, or network load of each videoconferencing endpoint.

13. The non-transitory computer accessible memory medium of claim 11, wherein said actively monitoring the videoconference call comprises invoking an active monitoring program comprised in the first videoconferencing endpoint to collect one or more of:

network data of the first videoconferencing endpoint, comprising one or more of:

media packets of the first videoconferencing endpoint; or signaling packets of the first videoconferencing endpoint;

critical log data of the first videoconferencing endpoint; or configuration data of the first videoconferencing endpoint.

14. The non-transitory computer accessible memory medium of claim 13, wherein said automatically analyzing comprises:

comparing source and destination addresses and ports of the media packets of the first videoconferencing endpoint with source and destination addresses and ports indicated by signaling packets of the first videoconferencing endpoint.

15. The non-transitory computer accessible memory medium of claim 11, wherein the program instructions are further executable by a processor to implement:

in response to determining that said automatically analyzing the active monitor data from the first videoconferencing endpoint cannot determine the at least one problem:

invoking an active monitoring program comprised in at least one other videoconferencing endpoint to actively monitor the videoconference call, thereby generating additional active monitor data;

wherein said receiving and automatically analyzing the active monitor data to determine the at least one problem causing lack of call quality comprises:

receiving and automatically analyzing the additional active monitor data to determine the at least one problem causing lack of call quality.

16. A non-transitory computer accessible memory medium storing program instructions for performing a videoconference call between a plurality of participants at respective participant locations, wherein the videoconference call is performed using a plurality of videoconferencing endpoints at respective ones of the participant locations, wherein the program instructions are executable by a processor of each videoconferencing endpoint to implement:

sending values of one or more parameters to a server computer during the videoconference call for passive monitoring by the server computer; and in response to receiving an invocation of an active monitor program comprised in the videoconferencing endpoint from the server computer:

the active monitor program actively monitoring the videoconference call, thereby generating active monitor data; and the active monitor program sending the active monitor data to the server computer for analysis, wherein the invocation is in response to the server computer detecting values of the one or more parameters from a first videoconferencing endpoint indicating a lack of call quality, and wherein the active monitor data is useable to determine at least one problem causing lack of call quality.

17. The non-transitory computer accessible memory medium of claim 16, wherein the one or more parameters comprise one or more of:

jitter, packet loss, frame rate, resolution, audio packet receive/transmit, video packet receive/transmit, CPU load, memory load, or network load of the videoconferencing endpoint.

18. The non-transitory computer accessible memory medium of claim 16, wherein said active monitor program actively monitoring the videoconference call comprises the active monitor program collecting one or more of:

network data of the first videoconferencing endpoint, comprising one or more of:

media packets of the first videoconferencing endpoint; or signaling packets of the first videoconferencing endpoint;

critical log data of the first videoconferencing endpoint; or configuration data of the first videoconferencing endpoint.

19. The non-transitory computer accessible memory medium of claim 18, wherein said active monitor program actively monitoring the videoconference call further comprises:

the active monitor program invoking an active monitor program comprised in a second videoconferencing endpoint to:

reflect network data received from the first videoconferencing endpoint back to the first videoconferencing endpoint; and the active monitoring program sending the collected and reflected data to a server computer for said automatically analyzing.

20. The non-transitory computer accessible memory medium of claim 18, wherein said automatically analyzing comprises:

comparing source and destination addresses and ports of the media packets with source and destination addresses and ports indicated by the signaling packets.

21. The non-transitory computer accessible memory medium of claim 16, wherein the program instructions are further executable by a processor of each videoconferencing endpoint to implement:

in response to the server computer determining that automatically analyzing active monitor data from a first videoconferencing endpoint cannot determine the at least one problem:

receiving an invocation of an active monitor program comprised in the videoconferencing endpoint from the server computer:

the active monitor program actively monitoring the videoconference call, thereby generating additional active monitor data;

the active monitor program sending the additional active monitor data to the server computer for analysis, wherein the additional active monitor data is useable to determine at least one problem causing lack of call quality.

22. The non-transitory computer accessible memory medium of claim 16, wherein the program instructions are further executable by a processor of each videoconferencing endpoint to implement:

the active monitoring program analyzing at least some of the active monitor data to generate endpoint analysis results; and wherein said sending the endpoint analysis results to the server computer further comprises sending the endpoint analysis results to the server computer for analysis.

23. A computer-implemented method for performing a videoconference, comprising:

utilizing one or more computers to implement:

passively monitoring a videoconference call between a plurality of participants at respective participant locations, wherein the videoconference call is performed using a plurality of videoconferencing endpoints at respective ones of the participant locations, and wherein said monitoring comprises monitoring one or more parameters from each of the videoconferencing endpoints;

in response to detecting values of the one or more parameters from a first videoconferencing endpoint indicating a lack of call quality, invoking an active monitoring program comprised in the first videoconferencing endpoint to actively monitor the videoconference call, thereby generating active monitor data;

receiving and automatically analyzing the active monitor data to determine at least one problem causing lack of call quality; and automatically determining and performing at least one action to address the at least one problem.

24. A system for performing a videoconference call between a plurality of participants at respective participant locations, wherein the videoconference call is performed using a plurality of videoconferencing endpoints at respective ones of the participant locations, the system comprising:

a server computer, comprising:
  a processor; and
  a memory, coupled to the processor; and
a plurality of videoconferencing endpoints, each comprising:
  a respective processor; and
  a respective memory, coupled to the respective processor;
wherein each of the plurality of videoconferencing endpoints is coupled to the server computer over a network;
wherein the memory of the server computer stores program instructions executable by the processor of the server computer to:
  passively monitor the videoconference call, wherein said monitoring comprises monitoring one or more parameters from each of the videoconferencing endpoints; and
  in response to detecting values of the one or more parameters from a first videoconferencing endpoint indicating a lack of call quality, invoke an active monitoring program comprised in a first videoconferencing endpoint of the plurality of videoconferencing endpoints to actively monitor the videoconference call;
wherein the memory of each of the plurality of videoconferencing endpoints stores program instructions executable by the processor of the videoconferencing endpoint to:
  actively monitor the videoconference call, thereby generating active monitor data; and
  send the active monitor data to the server computer for analysis; and
wherein the memory of the server computer further stores program instructions executable by the processor of the server computer to:
  automatically analyze the active monitor data to determine at least one problem causing lack of call quality; and
  automatically determine and perform at least one action to address the at least one problem.

25. A non-transitory computer accessible memory medium storing program instructions for performing a videoconference, wherein the program instructions are executable by a processor to implement:

receiving user input invoking active monitoring of a videoconference call between a plurality of participants at respective participant locations, wherein the videoconference call is performed using a plurality of videoconferencing endpoints at each of the participant location;

in response to said receiving user input, invoking an active monitoring program comprised in the first videoconferencing endpoint to actively monitor the videoconference call, thereby generating active monitor data;

receiving and automatically analyzing the active monitor data to determine at least one problem causing lack of call quality; and automatically determining and performing at least one action to address the at least one problem.

* * * * *